United States Patent [19]
Wadsworth

[11] 3,858,660
[45] Jan. 7, 1975

[54] FEED CONVEYOR APPARATUS

[76] Inventor: William F. Wadsworth, 402 W. McPherson Hwy., Clyde, Ohio 43410

[22] Filed: Sept. 14, 1972

[21] Appl. No.: 288,912

[52] U.S. Cl................... 171/57, 171/61, 56/327 R, 130/5 J, 198/214
[51] Int. Cl............................................ A01d 25/04
[58] Field of Search..... 56/119, 104, 327 R, DIG. 1; 130/5 J, 5 B, 5 C; 171/57, 28, 61; 198/214

[56] References Cited
UNITED STATES PATENTS

| | | | |
|---|---|---|---|
| 1,018,881 | 2/1912 | Culbertson | 130/5 C |
| 1,668,157 | 5/1928 | Kopitke et al. | 171/57 |
| 2,182,772 | 12/1939 | Nightenhelser et al. | 56/119 |
| 2,569,175 | 9/1951 | Karlsson | 130/5 J |
| 2,728,183 | 12/1955 | Ratmeyer | 130/5 J |
| 2,881,579 | 4/1959 | Aasland | 56/104 |
| 3,589,117 | 6/1971 | Wadsworth | 56/327 R |

FOREIGN PATENTS OR APPLICATIONS

| | | | |
|---|---|---|---|
| 127,884 | 0/1960 | U.S.S.R. | 56/119 |
| 238,934 | 0/1969 | U.S.S.R. | 56/119 |

*Primary Examiner*—Antonio F. Guida

[57] ABSTRACT

The preferred embodiment of the invention is disclosed in a machine for harvesting vegetables having an edible head portion to be separated from a stem portion including a carriage to be advanced on the ground along a row of the vegetables, cutters on the carriage for trimming the stems from the heads, and feed conveyor rollers for grasping and pulling down on a stem while conveying the stem and head to the cutter. Means are also provided for orienting the stem and head of a vegetable in that row for engagement by the stem grasping means. Aligning means above the stem grasping means and the cutter means holds the head to provide a right angle stem cut. The axes of the feed roll conveyors are diverged away from each other at the front to enable entry of a large range of stem sizes into the conveying means. The effective diameter of each of the feed rollers is reduced from a larger diameter intermediate the length of each roll to a smaller diameter at the rear end of each feeder roll. This enables the surfaces defined by the effective diameters on the latter portion of the rollers to be placed in parallel and spaced apart the distance desired for proper stem grasping.

9 Claims, 11 Drawing Figures

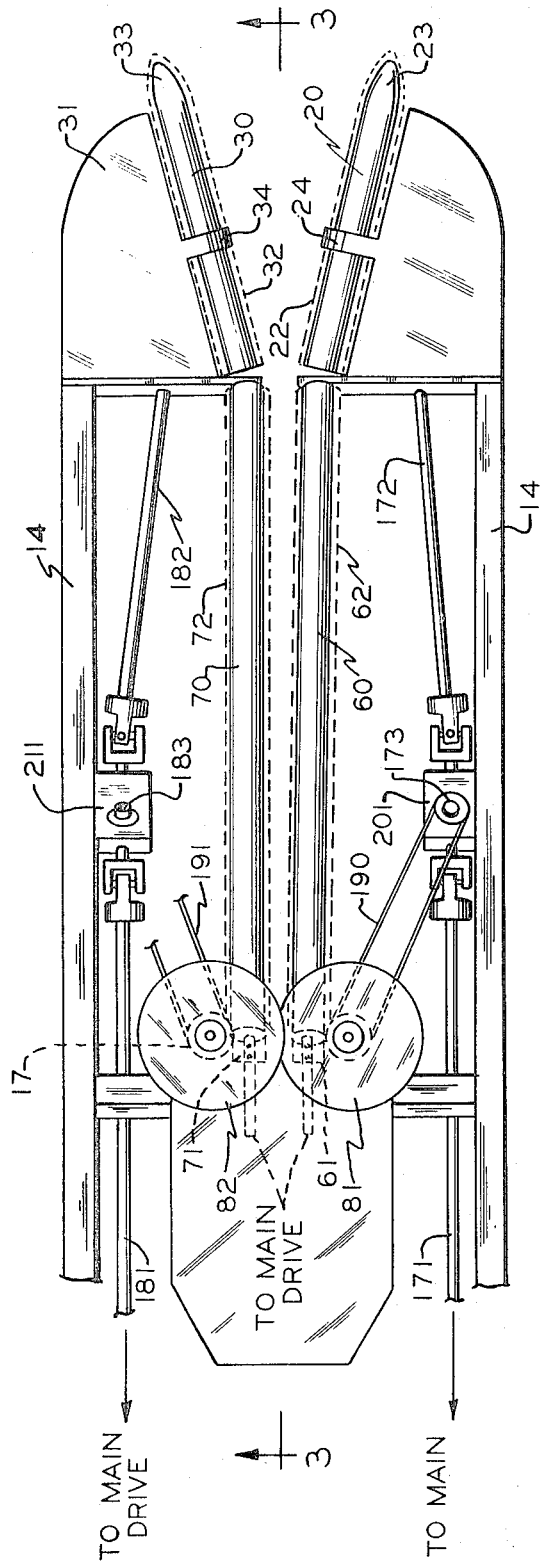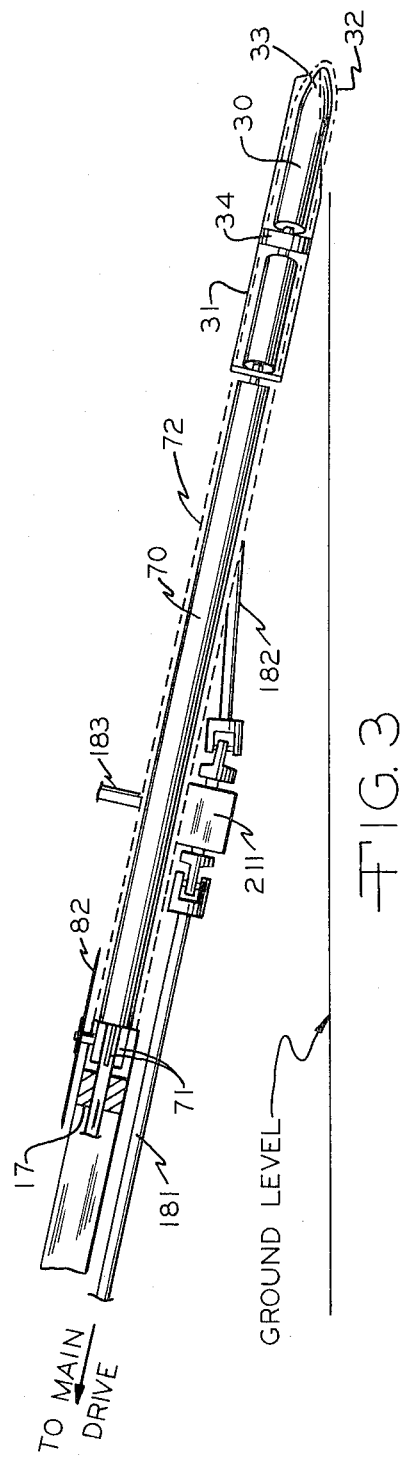

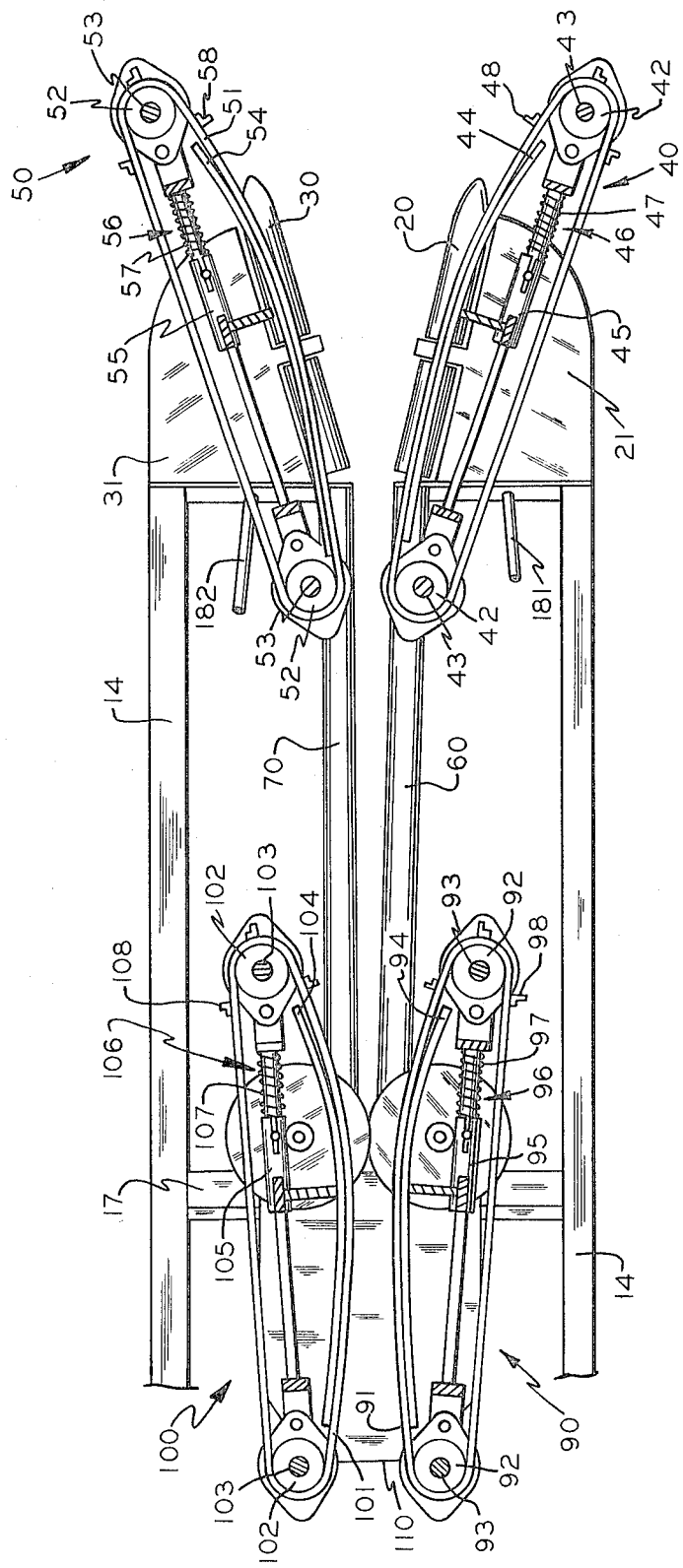

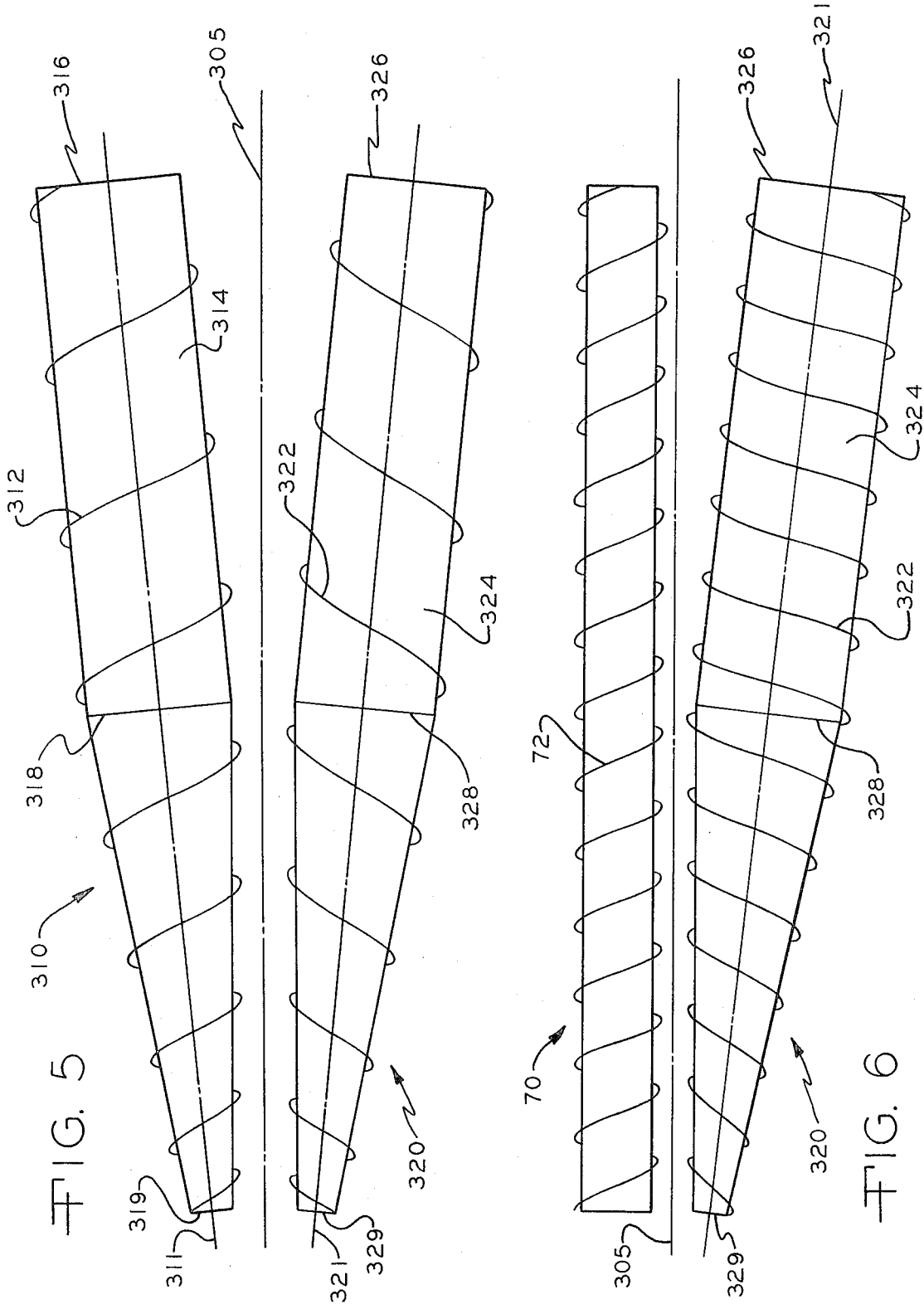

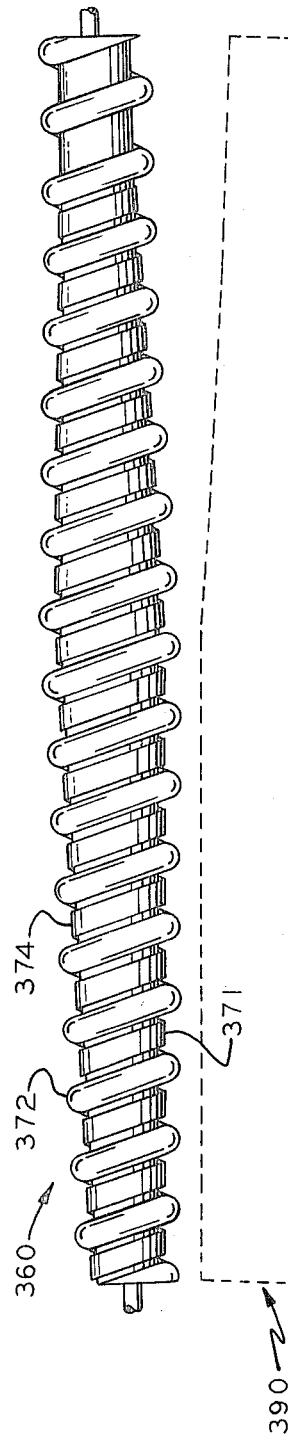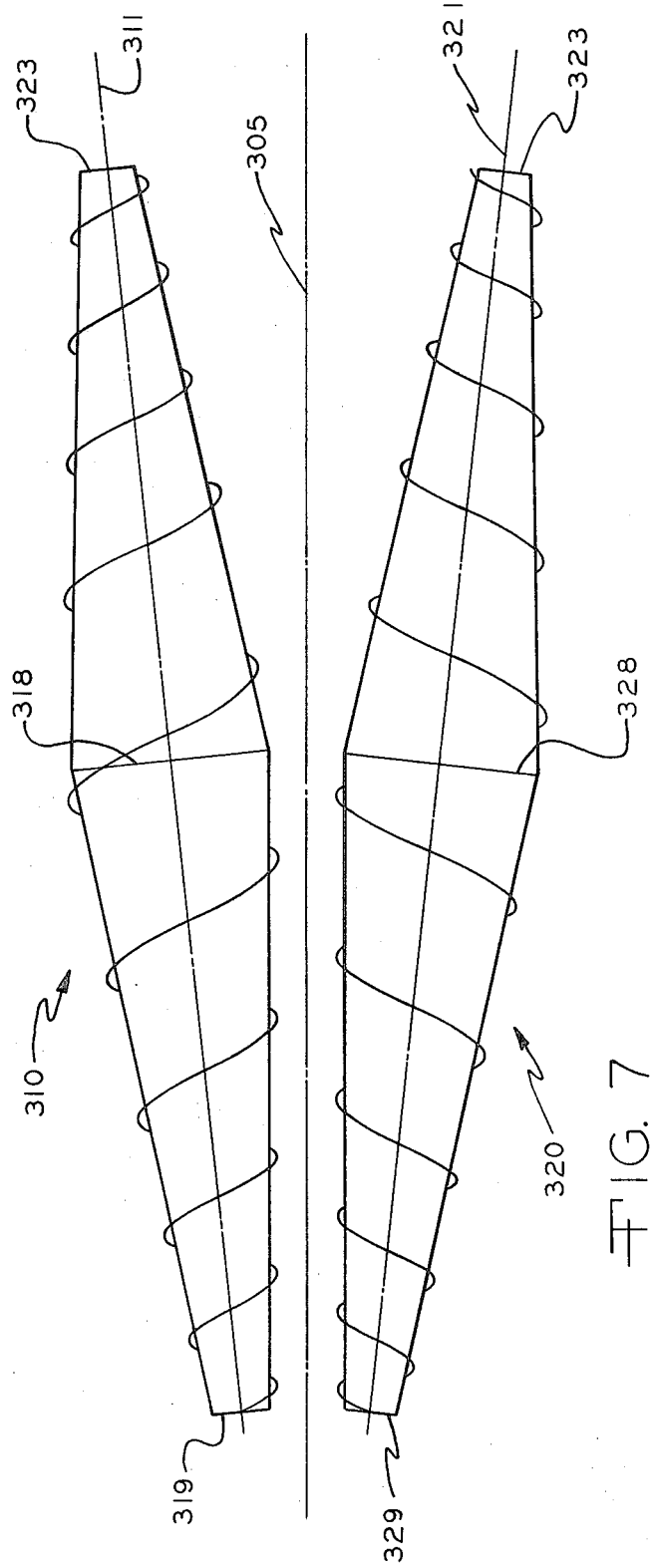

FEED CONVEYOR APPARATUS

BACKGROUND OF THE INVENTION

Many features of this invention are adapted to the harvesting of vegetables in general, however the preferred embodiment of the invention shown herein has been especially adapted to the harvesting of cabbages or other vegetables having an edible head portion.

Heretofore, it has been customary to harvest cabbage and other edible head vegetables by hand, cutting each cabbage head from a stalk. Storage cabbage, known commonly as "market" cabbage for use on the table, after being cut from its stem, is usually placed in bushel baskets disposed in convenient points along the cabbage rows in the field; and the baskets must thereafter be picked up and transported away. Kraut cabbage, generally larger cabbage heads which are used to make sauerkraut, after being cut from their stems has to be thrown by pitchfork into a transport wagon. A good worker has been able to harvest at the most about five to eight tons of cabbage a day. This manual harvesting of cabbage is laborious, time-consuming and expensive.

Several attempts have been made in the past to provide an automatic cabbage harvester to improve the speed of harvesting and reduce the manual labor involved. However, such machines have been useful in only very tightly controlled experimental conditions and few of the machines are in actual use. The problems involved in harvesting cabbage were approaching a critical juncture because of the shortage of labor generally and the inexperience of that labor force that is available. Inexperienced cabbage harvesters either cannot manually produce the necessary tons per day or, in attempting to produce the necessary tonnage, ruins or spoils a relatively large percentage of the cabbage that is harvested.

A harvesting machine was introduced to the industry, and is described in detail in my U.S. Pat. No. 3,589,117, issued June 29, 1971, which solved many of the problems. However, further problems have arisen in using this machine to harvest both kraut and market types of cabbage, and in using the machine in fields where the heads vary substantially in size.

Accordingly, it is an object of this invention to provide a cabbage harvesting machine which is able, without adjustment, to harvest and trim both market cabbage and kraut cabbage, as well as varying sizes of each.

It is a further object of this invention to provide a machine of the character described which uses novel feed conveyor means to accommodate heads and stems of many varied sizes.

It is a still further object of this invention to provide a novel feed roller, and a novel feed conveyor incorporating a coacting pair of the novel feed rollers.

It is to be noted that the teachings of this invention are intended to be applied not only to the harvesting of edible head vegetables but also edible root vegetables even though particularly useful in harvesting "head" vegetables.

SUMMARY OF THE INVENTION

This invention features apparatus for carrying out the above objects and overcoming the problems encountered heretofore in this area of harvesting which includes a carriage adapted to be advanced on the ground along a row of such vegetables, cutter means on the carriage for trimming one portion of the vegetable from the other portion and novel feed conveyor means for grasping and pulling tight the non-edible portion of the vegetable while conveying the grasped and edible portions of the vegetable to the cutter means.

When applied to the harvesting of edible head vegetables such as cabbage, the grasping means pulls down on the stem thereof while conveying the stem and head to the cutter means. Orienting means may be provided to orient the stem and the head of the cabbage in the row for engagement by the stem grasping and conveying means. The orienting means may include means for lifting the head from the ground and centering the head and stem with respect to the grasping means.

The stem grasping and conveying means includes coacting conveyor rollers and means for rotating the rollers to pull a stem down between same. Each feed roller may consist of a longitudinally extending tubular body having spiral rib means extending around and along the outer surface of the tubular body. The effective diameter of each feed roller is decreased from a first diameter intermediate the ends thereof to a second smaller diameter at the rear end of the tubular body. This enables the rollers to be supported with their axes diverging to accept large varieties of stem sizes, but have the decreasing effective diameters substantially parallel to firmly grasp and pull down on the stems.

Second aligning means are provided above the grasping means and the cutting means, to hold a head in a predetermined position for cutting the stem at a desired angle. The desired angle is usually at a right angle with respect to the stem and the cabbage head.

The second aligning means are advantageously spaced from the first orienting means so that a head and a stem rides a short distance on the coacting feed rollers to permit a further orientation and seating of the head on and the stem in the decreasing effective diameter portion of the feed rollers. In this short distance there is no contact between either of the aligning or orienting means with the cabbage head.

Other objects, features and advantages of this invention will become apparent when the following description is taken in conjunction with the accompanying drawings, in which:

FIG. 2 is a plan view of a portion of a tiltable frame including the pickup, orienting and cutting stations of this invention as shown in FIG. 1;

FIG. 3 is a side elevational view of the apparatus illustrated in FIG. 2;

FIG. 4 is a plan view of the apparatus illustrated in FIG. 2 in which the details of and the positioning of the front or forward gathering conveyors and the rear or aligning conveyors are illustrated;

FIG. 5 is a diagrammatic view of coacting feed rollers embodying the teachings of this invention;

FIG. 6 is a diagrammatic view of a second embodiment of coacting feed rollers;

FIG. 7 is a diagrammatic view of a third embodiment of coacting feed rollers; and FIGS. 8 to 11 illustrate a preferred embodiment of feed rollers which may advantageously be combined with the machine illustrated in FIGS. 1 to 4 to provide novel harvesting apparatus.

DESCRIPTION OF THE PREFERRED EMBODIMENTS

Figure 1:
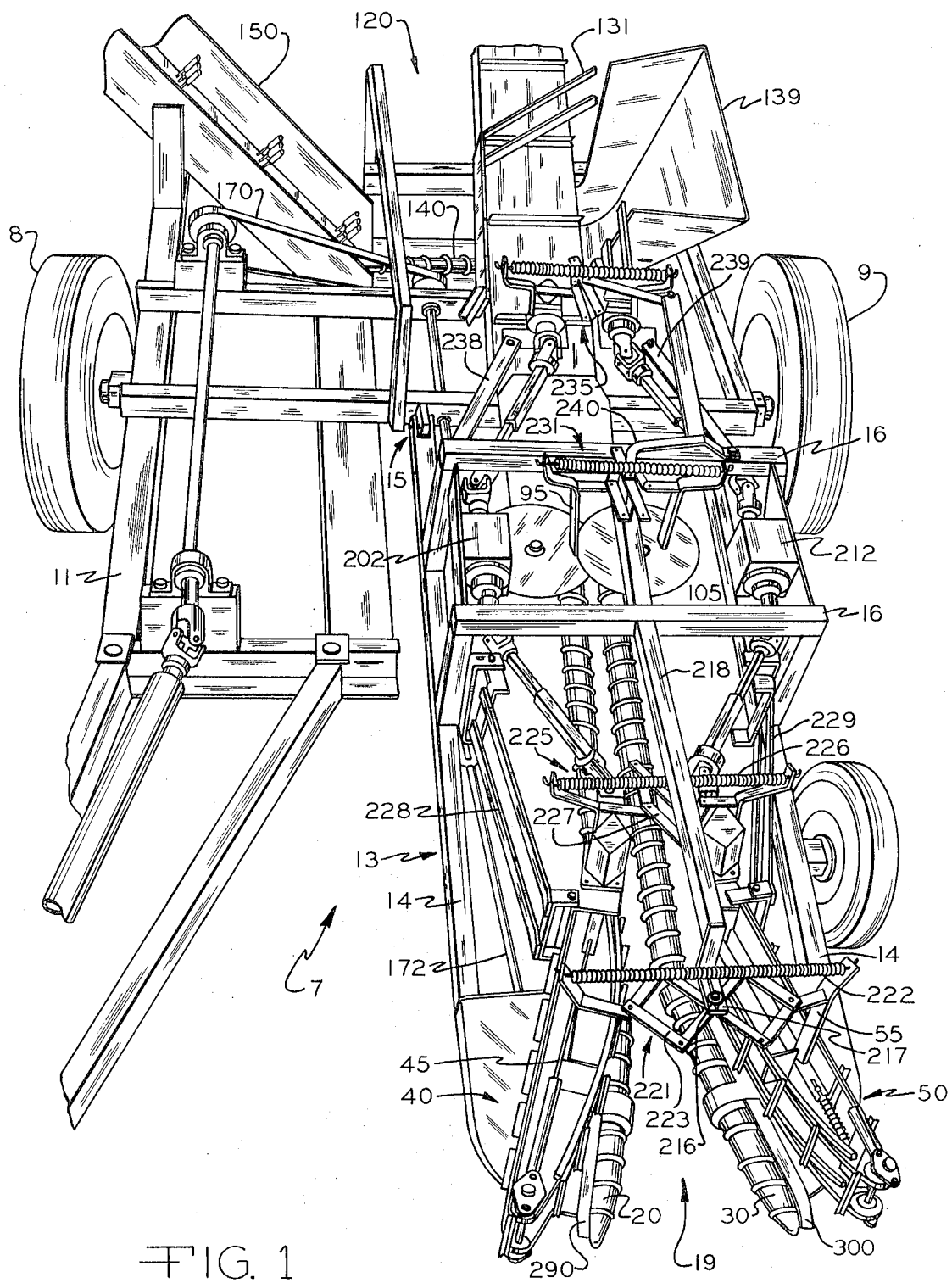
FIG. 1 is a view in perspective from the front and above, of apparatus which may embody the teachings of this invention, in which the rear aligning conveyors have been omitted to permit showing of the other coacting features of this apparatus more clearly.

Referring to FIGS. 1 through 4 there is illustrated apparatus in which the teachings of this invention may be embodied and which includes a carriage generally indicated at 7 rollably supported by wheels 8 and 9 attached to a main frame 11. A tilting frame generally indicated at 13 is pivotally supported on main frame 11 by pivot assemblies 15. The tilting frame comprises longitudinal beams 14, upper cross brace members 16, and one or more lower cross brace beams or members 17. A hydraulic apparatus, controlled from the tractor or other pulling means (not shown) may be utilized to lower the tilting frame 13 to a harvesting position and raise it from the harvesting position to a traveling position when moving from field to field.

A pick-up station for the cabbages or other vegetables being harvested is indicated generally at 19 and comprises orienting means including coacting lifting conveyor rollers 20 and 30 having forward tapered portions 23 and 33 supported in spaced relationship on each side of a row to be advanced beneath a head, and endless gathering conveyor means 40 and 50 having substantially vertically disposed and rearwardly moving runs 41 and 51 supported in spaced opposing relationship on each side of the row to contact and center the heads.

The coacting lifter conveyor rollers 20 and 30 have rear portions which converge toward each other to feed a stem and head to a stem grasping means including a left main auger or feed roller 60 and a right main auger or feed roller 70. Mechanical links 172 and 182 from lower gear boxes 201 and 211 provide driving connections to drive housings 21 and 31 and, via gearing arrangements therein and in housing extensions 24 and 34, drive rollers 20 and 30 at a conveying rate at least sufficient to move the head and stem along a conveying lifting roller as fast as the carriage moves along the row. Since cabbage heads do not always grow directly in line on the row, but frequently to the left or right depending upon the direction the stalk or stem grows, the lifting conveyor rollers 20 and 30 are driven at a conveying rate in excess of carriage speed to permit centering of the head and stem by both rollers at the convergence thereof before engagement by the stem grasping means.

It is to be noted that the lifting conveyor rollers enable the pickup of smaller heads, particularly to be found in market cabbage, so that the heads are lifted above the converging portion of the pick-up station to prevent the heads from becoming jammed at the convergence and stopping operation of the machine. The conveyors roll upwardly and outwardly so that the head is lifted above the convergence and the stem is oriented thereby in cooperation with the convergence of the opposing runs 41 and 51 to orient the head, even though small, and the stem for entry into the stem grasping means.

The lifting conveyor rollers 20, 30 advantageously carry spiral ribs 22, 32 thereon to assist in the lifting and conveying action thereof. Each roller 20, 30 has a forwardly tapered front end 23, 33 to assist in lifting a head for conveying by the roller. As shown in FIG. 3, the tapered ends may be inserted into the ground.

As noted hereinbefore the endless gathering conveyors have substantially vertically disposed and rearwardly moving runs 41, 51 supported in spaced opposing relationship on each side of the row to contact and center the heads. The rear portions of the opposing runs of the gathering conveyor converge toward each other.

The opposing runs 41, 51 are yieldingly biased in a predetermined spaced relationship by a first resilient means and biasing assembly 221 connecting the gathering conveyors intermediate the length of the opposing runs, and second resilient means and biasing assembly 225 connecting the gathering conveyors at the rear portions of the opposing runs.

Each gathering conveyor 40, 50 includes end shafts 43, 53 supported in a frame means 45, 55 including a telescoping section 46, 56 and spring means 47, 57 for yieldingly biasing the telescoping section to maintain a predetermined tension on the runs 41, 51 of the conveyors 40, 50.

The opposing runs 41, 51 of the gathering conveyors 40, 50 are arched toward each other by track means 44, 54 attached to the support frames 45, 55. This permits the rapid initial coarse centering of a head contacted by the opposing runs. The rearward portions of the converging arches permit coaction by the opposing runs 41, 51 for vernier centering adjustment.

As best seen in FIG. 1 upward extensions of support frames 45, 55 are connected by a spring 222 of the biasing means 221 and by an accordion positioner 223. The relative portion of the accordion positioner 223 is maintained by a slot-sliding bolt arrangement 216 in an extension 217 of support brace 218. The support brace 218, slot-bolt arrangement 216 also maintains the gathering conveyors 40, 50 at a desired height above the roller conveyors 20, 30. Further the slot-bolt arrangement 216 insures that the opposing runs 41, 51 maintain a centering position with respect to the main augers 60, 70 and the lifting rollers 20, 30.

Similarly, upward extensions of support frame 45, in this instance gear boxes attached to drive rear shafts 43, 53, are connected by spring means 226 and, with accordion positioner means 227, comprise the second biasing means connecting the rear portions of the gathering conveyors 40, 50. Support struts 228, 229 are pivotally connected to the forward cross brace 16 of the tilting frame 13 and to the rear portions of the support frame of the gathering conveyors 40, 50. The swinging support struts control the height of the rear portion and thus, in combination with the support brace 218, controls the height of both the rear and the forward portions of the gathering conveyors 40, 50. The pivotal supporting of support struts 228, 229 permits the rear portions, and thus the front portions, of the gathering conveyors 40, 50 to move inwardly and outwardly to accept various head sizes.

Thus the forward portions of the gathering conveyors 40, 50 are maintained in an opened gathering and receiving position and, with the biasing means 221, 225, yieldingly holds the gathering conveyor 40, 50 in a predetermined spaced relationship to insure a sufficient separation to permit entry of a head therebetween and the adjustment of the spacing along the opposing runs 41, 51 to accommodate different size heads as centering and orientation take place.

The opposing runs 41, 51 of gathering conveyors 40, 50 are preferably driven at a conveying rate faster than the ground movement of the carriage to permit gathering and centering of a head before the grasping means arrives at the stem thereof. Since the runs of the conveyor must cover a longer oblique distance than the straight ahead run of the carriage the speed should be faster than the carriage speed. Each run advantageously carries a plurality of outwardly extending elements 48, 58 on their respective runs to permit positive engagement of a run with a head.

The stem grasping and feeder conveyor means shown in FIGS. 1, 2, 3 and 4 as a left main auger or feed roller 60 and a right main auger or feed roller 70 are formed as shown in my U.S. Pat. No. 3,589,117. The grasping rollers of my previously disclosed machine carrying spiral ribs 62, 72 thereon to assist in the conveying and grasping action thereof. The rollers rotate toward each other and downwardly to provide a firm grasp and a centering action on the head as the head and stem are conveyed back toward the cutter means 80. The grasping conveyor rollers are advantageously driven at a conveying rate substantially equal to the ground speed of the carriage. The grasping conveyor rollers 60, 70 advantageously converge slightly toward each other from the front portion thereof toward the rear portions to permit the entrance and engagement of a variety of stem sizes while still providing a grasping action.

For best results, the front ends of rollers 60, 70 are advantageously spaced further apart than the diameter of the largest stem expected. Thus as the head is conveyed back by the spiral ribs 62, 72, the coacting rollers gradually apply a grasping or downward pull on the stem as the rollers converge toward each other.

As best seen in FIGS. 2 and 3, at the end of the conveyor roller 70 nipper blades 71 cooperate with nipper blades 61 at the end of roller 60 beneath the cutter means to forcibly grasp and eject severed stems to prevent the mechanism from jamming.

As illustrated in FIG. 4, although omitted from FIG. 1 in the interest of clarity, a second aligning means comprising endless aligning conveyors 90, 100 having substantially vertically disposed and rearwardly moving runs 91, 101 supported in spaced opposing relationship above the grasping means 60, 70 and the cutting means 80 to hold a head in a predetermined position for cutting the stem at a desired angle. While the cutting angle of a stem from a head is desirable in market cabbage for the purposes of appearance it is crucial when harvesting kraut cabbage since the cut of the stem from the head must be made at a substantially right angle with respect to the junction of the stem with the head so that the coring knives in a kraut plant will not slip off an angled cut and injure or otherwise destroy the cabbage head and/or jam the coring machines. Thus, the aligning conveyors 90, 100 cooperate with the grasping rollers 60, 70 to hold the heads during the cutting to provide the right angle cut desired.

As noted hereinbefore with the gathering conveyors, the opposing runs 91, 101 of the aligning conveyors 90, 100 are arched toward each other by track means 94, 104 attached to support frames 95, 105 to insure a positive grip on the head as it is directly above the cutting means 80, without regard to heads within the aligning conveyors before and after the cutting station, or the size of those heads.

The aligning conveyors 90, 100 are driven at substantially the same conveying rate as the grasping means in order to most effectively align the cabbage heads and stems without abrading or causing a misalignment because of varying speed. As described hereinbefore with respect to the gathering conveyors 40, 50 the aligning conveyors 90, 100 each include end shafts 93, 103 journally supported in frame means 95, 105. The frame means 95, 105 include telescoping sections 96, 106 and spring means 97, 107 for yieldingly biasing the telescoping section to maintain a predetermined tension on the run of the conveyor.

Sprocket means 42, 52, 92, 102 for all the conveyors are mounted on shafts 43, 53, 93, 103 to guide chain and/or belt means and drive same on the conveyors 40, 50, 90, 100, respectively. This provides a positive pickup and, in cooperation with transverse elements 48, 58, 98, 108, allows positive grasping and centering of heads, which provides advantages in handling certain varieties over the use of ordinary endless belts. Endless belts may be used in other applications.

As described hereinbefore for the gathering conveyors 40, 50 means are provided for yieldingly biasing the opposed runs 91, 101 of the aligning conveyors 90, 100 in a predetermined spaced relationship to insure a sufficient separation to permit entry of a head therebetween and the adjustment of the spacing along the runs to accommodate different head sizes.

The yieldingly biasing means 231 is connected to upper extensions of support frames 95, 105 of aligning conveyors 90, 100 (the upper extensions of frames 95, 105 being best seen in FIG. 1 through the aligning conveyors 90, 100 are omitted for purposes of clarity).

A first yieldingly biasing means 231 includes a spring means and an accordion positioner supported by support brace 240 which is connected to cross brace 16 to perform the same function as noted hereinbefore as support brace 218. Similarly, a second yieldingly biasing means 235 is connected to driving means mounted on extensions from support frames 95, 105 and includes a spring means and an accordion positioner means, the function of the yielding biasing means 235 for the rear portions of aligning conveyors 90, 100 being the same as or similar to the function of biasing means 225 for gathering conveyors 40, 50.

The portions of the alignig conveyors 90, 100 are supported by strut means 238, 239 which are pivotally connected to cross brace 16 and to the rear portions of the aligning conveyors 90, 100 in the same manner that support struts 228, 229 are connected to a cross brace 16 in the rear portions of conveyors 40, 50. The function and operation of support struts 238, 239 is the same as the functions of support struts 228, 229.

The opposing runs 91, 101 of aligning conveyors 90, 100 carry outwardly extending elements 98, 108 to insure a positive engagement of the head by the opposing runs. The aligning conveyors and the opposing runs thereof are advantageously sufficiently long to carry a severed head to a collecting station at the rear of the machine.

It has been discovered that, although the coacting conveyor rollers shown in FIGS. 1 through 4 are very adequate for most of the harvesting conditions encountered, there are some conditions when conveyor rollers in the form shown at 60 and 70 do not function as well as desired.

First, there are some cabbage varieties which, in combination with unexpected or uneven weather conditions during the growing season, will present an extreme variation in head and stem sizes when the time for harvesting arrives.

The rollers 60 and 70 have cylindrical tubular bodies on which the spiral ribs are disposed, and thus the effective dimaeter of each roller is the same from the front to the rear. The effective diameter of a feed roller is here defined as that diameter of the cross-section of a roller between the spiral ribs which defines an outer surface of the tubular body which will grasp and pull down on the side of a stem. When the stem reaches a point along the pair of coacting rollers where the stem diameter is greater than the distance between the outer surfaces of the tubular bodies defined by the effective diameters of each tubular body, the stem is grasped between the outer surfaces and is pulled downwardly to enable the head to be oriented and centered on the conveying rollers.

As noted hereinbefore, this advantageously occurs after the head has left the gathering or initial orienting means 40, 50, and before the head is engaged by the cutter aligning means 90, 100.

If there is an extremely large difference between the largest and the smallest of the stems in the field, then the front ends of the rollers 60, 70 must be set far enough apart so that the largest of the stems will be admitted between the rollers. However, because the effective diameter of the rollers 60, 70 stays the same from the front to the rear of each roller, the diameter of the small stems will not be as large as the distance between the outer surfaces of the tubular bodies in the zone between the initial orienting conveyors 40, 50 and the final alignment holding conveyors 90, 100. Therefore, there can be no pulling down on the small stems in the head-centering zone, and the head may enter the rear conveyors at an angle, causing a severing of the stem from the head at an undesirable angle.

This problem will occur even though the rear ends of the rollers 60, 70 are set as close together as possible.

Secondly, a problem may occur when the variation in head sizes is extreme. When the spacing and size of the spiral ribs is correct to enable proper stem severing for large size heads, the smaller heads may ride too far down in the troughs between the spiral ribs to enable the cutter means to slice away only the stem and superfluous outer leaves. As a result, part of the desirable lower portion of the head may be cut away and lost.

Also, when the front of the rollers are set far enough apart to accept the largest stem, it is possible for a very small, dwarfed head to jamb between the rollers 60, 70.

To solve these problems, new forms of feed rollers have been developed and are shown in FIGS. 6 through 12.

Referring to FIG. 5, there is diagrammatically illustrated a pair of coacting feed rollers 310, 320, each having spiral rib means 312, 322 extending along and around the outer surfaces 314, 324 of tubular bodies 316, 326.

The effective diameter of the feed rollers 310, 312 is the same for the first portion of each roller. Starting at intermediate diameters at 318, 328, the effective diameter of the tubular bodies decreases to smaller diameters 319, 329 at the rear end.

The feed rollers 310, 320 may then be supported in the frame of the machine so that the outer surface of each roller defined by the decreasing effective diameter between the intermediate diameters 318, 328, and the smaller rear diameters 319, 329 are substantially parallel to each other and to the center line 305 of a row of vegetables. These decreasing outer surfaces are then spaced from each other and an equidistance on each side of the center line 305 so that the smallest stem will be grasped and pulled down to center the head on the feed rollers while feeding the vegetable to the cutter means. This enables the forward outer surfaces of both bodies 316, 336, which have the same effective diameter throughout, to be diverged away from the center line 305 to insure entry of the largest stems into the conveyor means.

FIG. 5 is thus an exaggerated diagrammatic example of feed rollers in which the axes 311, 321 of the feed rollers may be diverged away from a center line 305 a substantial distance to enable entry of large stems, while still enabling the spacing of the stem grasping and pulling outer surfaces very closely. When the rollers 310, 320 are mounted in the machine depicted in FIG. 1, the rollers would be positioned so that the intermediate diameters 318, 328 are positioned in the zone between the initial orienting conveyors and the head alignment holding conveyors, to permit the centering of the head on the rolls before the head enters the head alignment holding conveyors.

Referring now to FIG. 6 there is illustrated an alternative embodiment in which a feed roll 320 of the type shown in FIG. 5 may be combined with a feed roll 70 of the type illustrated in FIGS. 1 through 4. As noted hereinbefore the effective diameter of the feed roll 70 remains the same throughout its length, while the effective diameter of the feed roll 320 is decreased during the later portion of its length. This enables the axis of the roller 320 to be diverged further away from the center line 305 than the axis of the roller 70 to enable entry of larger stems, while still providing a closely spaced distance between the two rollers starting from the intermediate diameter 328 of the feed roller 320 to grasp and pull down on the smallest stems. The embodiment illustrated in FIG. 6 is not as desirable however, because it is preferred to diverge the axes of both feed roll conveyors the same amount on each side of the row of vegetables to make it easier for the stem to be entered between the coacting rollers.

Referring now to FIG. 7 there is illustrated a still further embodiment of the invention in which the feed rollers 310, 320 have their effective diameters increased from a smaller initial or forward diameter 313, 323 to the larger intermediate diameters 318, 328. This configuration increases the amount of divergence available at the forward portion of the rollers 310, 320 without diverging the axes 311, 321 of the rollers further away from the center line 305.

Since operation room and mounting room for equipment components on a machine are important factors, including the mounting of means for driving and supporting the items such as the feed conveyor rollers 310, 320, the embodiment illustrated in FIG. 7 is the preferred embodiment, particularly when a multi-row machine is being built and/or when the rows of the cabbages or other vegetables are planted closely together.

Figure 8:
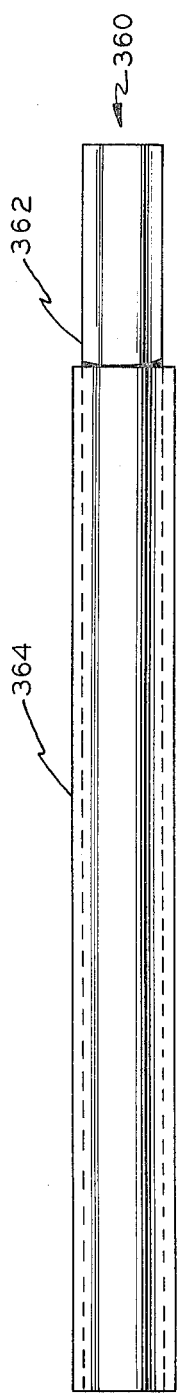
Figure 9:
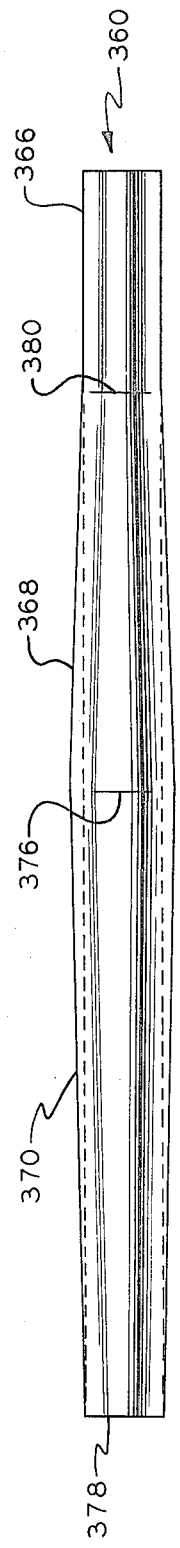
Figure 10:
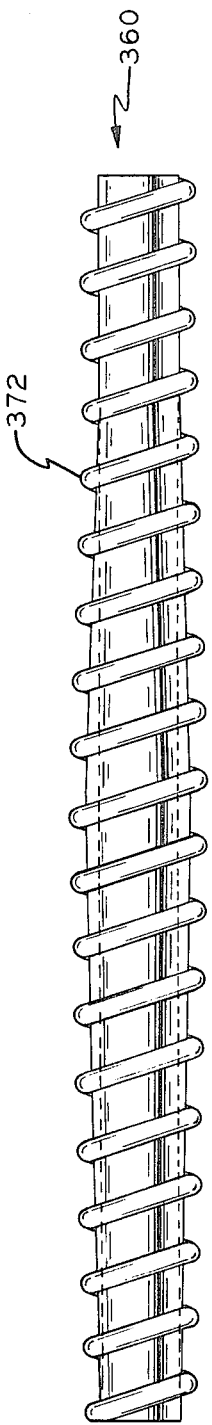

Referring now to FIGS. 8 to 10 there is illustrated in more detail a feed roller constructed according to the teachings of this invention. A layout of two such feed rollers in a coacting position is illustrated in FIG. 11. Although there are many ways of constructing a feed roller according to the teachings of this invention, the following method is shown, since it most clearly illustrates final form of the preferred embodiment.

A feed roller 360 is constructed by providing a tubular body 362 having the same diameter throughout its length and slipping a tubing section 364 over the outside of the tubular body 362 and securing the section 354 to the section 362 by welding or other suitable means. The combination illustrated in FIG. 8 is placed in a lathe and the pipe section 364 is turned to cut the effective diameter from a maximum diameter 376 intermediate the length of the roller 360 to a smaller, rear end diameter 378. Similarly, the pipe section 364 is machined in a lathe so that the effective diameter of the roll 360 increases from the forward diameter 380 until the intermediate maximum diameter 376 is reached. The resulting product is illustrated in FIG. 9.

Referring to FIG. 10 there is illustrated the feed roller after a spiral rib means 372 has been placed on the outer surface. In this instance, although not necessary in all embodiments, the pitch of the spiral rib 372 is maintained the same throughout the length of the feed roller. There is shown then, in FIG. 10, a feed conveyor roller 360 which may be utilized with another similar feed roller having the spiral ribs thereof wrapped around the outer surface in an opposite direction to the spiral ribs 372 so that the stems and heads are conveyed from right to left, in a layout similar to that illustrated diagrammatically in FIG. 7.

In some instances, it is desirable that the depths of the troughs between the spiral ribs 372 be reduced to either enable a small cabbage head to ride higher on the top of two coacting feeder conveyor rollers or to increase the effective diameter of the conveyor roller 360 at certain portions of the conveyor roll. This is illustrated in FIG. 11, in which the conveyor roller 360 is illustrated in a layout with a similar and coacting roller 390. The embodiment of FIG. 11 further includes a helical coil 374 made from flat strap or strip material and formed with the same pitch as the pitch of the spiral rib means 372. The helical coil 374 is then interposed between the ribs 372 in the troughs defined by the ribs to accomplish the objectives set forth hereinbefore.

The helical coil means 374 may include one or more layers of flat straps to increase the effective diameter of the conveyor roller 360 to the extent desired. Moreover, the end of one helical coil, of a multi-layer helical coil is utilized, may be extended past the end of a lower helical coil layer to provide an effective diameter that increases and/or decreases more than the increase and decrease provided for by the surfaces 368, 370 on the outside of the tubular body 360 (as shown in FIG. 9).

It should also be noted that the helical coil 374 may be constructed from a strap of material that increases in thickness from a smaller thickness at the initial portion, to a greater thickness at the intermediate portion, to a smaller thickness in the last portion to provide a means for increasing all of the effective diameters of the feed conveyor roller 360, from the forward diameter 380 to the intermediate diameter 376, and the rear diameter 378.

Whether the conveyor roller 360 is utilized in the form illustrated in FIG. 10 or the form illustrated in FIG. 11 of which the helical coil 374 has been added, the surface of the effective diameter of the roller between the intermediate diameter 376 and the rear diameter 378 is aligned substantially parallel to a center line 305 on the machine. The outer surface (370 in FIG. 9, and 371 in FIG. 11) is spaced from the center line 305 an amount equal to the spacing of the similar outer surface of the coacting roller 390, so that the smallest stem to be encountered in a field may be grasped and pulled down. As noted hereinbefore, the maximum intermediate diameter 376 is positioned so that the grasping and pulling down of the stem and the centering of the head on the rollers 360, 390 is located in the zone between the initial orienting conveyors and the alignment holding conveyors so that the centering may be accomplished after the head leaves the forward conveyors but before the head reaches the rear set of conveyors.

There has thus been described herein feed conveyor apparatus which includes a pair of opposed coacting feed rollers. Each of the feed rollers has a longitudinally extending tubular body and spiral rib means extending around and along the outer surface of the tubular body. At least one of the feed rollers has means for decreasing the effective diameter of the feed roller from a first diameter intermediate the ends of the tubular body to a second smaller diameter at one of the ends. This enables the disposition of the feed rollers with respect to each other and to a center line of a vegetable row to provide converging-diverging, converging-parallel, and parallel-diverging distances between the effective diameters of the pair of coacting feed rollers.

In use with the machine illustrated in FIGS. 1 to 4 the desired disposition is the converging-parallel relationship which brings the stem toward a center line and then maintains the stem grasped and pulled down at the center line in the parallel portion of the disposition to center the head, and to hold the stem and the head in the proper relationship during its trip through the head alignment holding conveyors to sever the stem from the head at the desired right angle. The preferred embodiment also includes means for increasing the effective diameter of the one feed roller from a third diameter, which is smaller than the second intermediate diameter and located toward the other end of the tubular body, to the larger intermediate diameter.

In the preferred embodiment the other of the feed rollers also has means for decreasing the effective diameter of the other feed roller from a first diameter intermediate the ends of the other feed roller to a second smaller diameter at one of the ends of the other feed roller, and for increasing the effective diameter of the other feed roller from a third diameter which is smaller than the second intermediate diameter and located toward the other end of the feed roller, to the size of the first intermediate diameter.

The first diameters in the latter instance are positioned opposite from each other and the surfaces defined by the effective diameters between the first and second tubular diameters are substantially parallel to each other.

In conclusion, it is pointed out that while the illustrated examples constitute practical embodiments of my invention, it is not intended to limit the invention to the exact details or dimensions shown or discussed, since modifications may be made without departing from the spirit and scope of the invention disclosed.

I claim:

1. A feed roller, comprising
   a. a longitudinally extending tubular body, b. spiral rib means extending around and along the outer surface of said tubular body, c. means for decreasing the effective diameter of the feed roller from a first diameter intermediate the forward and rear ends of said tubular body to a second smaller diameter at said rear end, and d. means for increasing the effective diameter of the feed roller from a third diameter, which is smaller than said second intermediate diameter and is located toward the front end of said tubular body, to said first intermediate diameter, e. said effective diameter increasing and decreasing means including strap means formed into a helical coil having the same pitch as and interposed between said spiral rib means on said tubular body, f. the thickness of said strap means increasing from a first smaller thickness to a second intermediate thickness larger than said first thickness, and then decreasing from said second thickness to a third thickness which is smaller than said second thickness.

2. Feed conveyor apparatus, comprising a. a pair of opposed coacting feed rollers, b. each of said feed rollers having a longitudinally extending tubular body and spiral rib means extending around and along the outer surface of said tubular body, c. at least one of said feed rollers having means for decreasing the effective diameter of said one feed roller from a first diameter intermediate the ends of the tubular body to a second smaller diameter at one of said ends, thereby enabling the disposition of the feed rollers with respect to each other to provide converging-diverging, converging-parallel, and parallel-diverging distances between the effective diameters of said pair of coacting feed rollers, d. the other of said feed rollers also having means for decreasing the effective diameter of said other feed roller from a first diameter intermediate the ends of said other feed roller to a second smaller diameter at one of said ends of said other feed roller, and for increasing the effective diameter of said other feed roller from a third diameter, which is smaller than said second intermediate diameter and located toward the other end of said other feed roller, to said first intermediate diameter.

3. Feed conveyor apparatus as defined in claim 2 in which said first diameters are positioned opposite from each other and in which surfaces defined by the effective diameters between said first and second diameters are substantially parallel to each other.

4. A machine for harvesting plants having an edible body portion to be separated from an undesirable portion, comprising a. a carriage adapted to be advanced on the ground along a row of plants to be harvested, b. cutter means on said carriage for trimming the undesirable portion from the edible body portion of said plants, c. a pair of opposed coacting feed rollers for grasping the undesirable portion of the plants and conveying the plants to said cutter means, d. each of said feed rollers having spiral rib means extending along outer surfaces of tubular bodies, e. at least one of said feed rollers having means for decreasing the effective diameter of said one feed roller from a first diameter intermediate the ends of the tubular body to a second smaller diameter at one of said ends of the tubular body, and f. means for supporting said feed rollers, the surface defined by the effective diameter of said one feed roller between said first and second diameters being substantially parallel to the surface defined by the effective diameter of the other of said feed rollers and spaced therefrom a distance enabling grasping and holding the undesirable portion of the plants as the plants are fed to said cutter means, thereby enabling the surface defined by the effective diameter of said one feed roller between said first diameter and the other end of that tubular body to diverge away from the surface defined by the effective diameter of the other feed roller to aid in the entry of the plants between the pair of rollers.

5. A machine as defined in claim 4 which further includes means for increasing the effective diameter of said one feed roller from a third diameter, which is smaller than said second intermediate diameter and located toward the other end of said tubular body, to said intermediate diameter.

6. A machine as defined in claim 4 in which the other of said feed rollers also has means for decreasing the effective diameter of said other feed roller from a first diameter intermediate the ends of said other feed roller to a second smaller diameter at one of said ends of said other feed roller, and for increasing the effective diameter of said other feed roller from a third diameter, which is smaller than said second intermediate diameter and located toward the other end of said other feed roller, to said first intermediate diameter.

7. A machine for harvesting vegetables having an edible head portion to be separated from a stem portion, comprising a. a carriage adapted to be advanced on the ground along a row of vegetables, b. cutter means on said carriage for trimming the stems from the heads, c. a pair of opposed coacting feed rollers for grasping and pulling down on a stem while conveying the stem and head to said cutter means, d. each of said rollers having spiral rib means extending along outer surfaces of tubular bodies, e. at least one of said feed rollers having means for decreasing the effective diameter of said one feed roller from a first diameter intermediate the ends of the tubular body to a second smaller diameter at one of said ends of the tubular body, and f. means for supporting said feed rollers, the surface defined by the effective diameter of said one feed roller between said first and second diameters being substantially parallel to the surface defined by the effective diameter of the other of said feed rollers and spaced therefrom a distance enabling grasping and pulling down on a stem and supporting the head on the feed rollers while feeding the vegetable to the cutter means, thereby enabling the surface defined by the effective diameter of said one feed roller between said first diameter and the other end of that tubular body to diverge away from the surface defined by the effective diameter of the other feed roller to enable entry of a large range of stem sizes between the pair of rollers.

8. A machine as defined in claim 7 which further includes a. means for orienting the stem and head of a vegetable in a row for guiding the stem between said pair of rollers, and
b. means for holding a head in alignment above said cutter means as a stem is cut therefrom,
c. said alignment means being spaced from said orienting means so that the start of said substantially parallel stem grasping surfaces of said feed rollers is located therebetween to enable a stem to be pulled down completely so that the head rests in a centered position on top of said feed rollers before said alignment means engages the head.

9. A machine as defined in claim 7 in which said means for decreasing the effective diameter of said one feed roller includes means for reducing the depth of the troughs between said spiral rib means, thereby enabling the head to ride higher on said feed roller means to provide a better control of the cutting area between stem and head for said cutting means.

* * * * *